(12) United States Patent
Nozaki

(10) Patent No.: US 6,388,681 B1
(45) Date of Patent: *May 14, 2002

(54) APPARATUS FOR MAKING RECORDING MEDIA WITH AUDIO CODE IMAGES

(75) Inventor: Iwao Nozaki, Wakayama (JP)

(73) Assignees: Noritsu Koki Co., Ltd., Wakayama; Olympus Optical Co., Ltd., Tokyo, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,414

(22) Filed: Oct. 13, 1998

(30) Foreign Application Priority Data

Oct. 17, 1997 (JP) .............................................. 9-284829

(51) Int. Cl.[7] .................................................. G09G 5/00
(52) U.S. Cl. ........................ 345/764; 345/778; 345/727; 707/512
(58) Field of Search ................................ 345/302, 978, 345/326, 348, 339, 764, 769, 770, 856, 862, 864, 867, 765, 778, 227, 701, 702, 727, 728, 835, 836, 838, 846, 847, 779, 73–732, 763; 707/500.1, 512

(56) References Cited

U.S. PATENT DOCUMENTS

| | | | | |
|---|---|---|---|---|
| 4,339,769 A | * | 7/1982 | Fujita et al. ..................... 358/6 |
| 4,346,407 A | * | 8/1982 | Baer et al. ................... 358/149 |
| 4,875,096 A | * | 10/1989 | Baer et al. ................... 358/143 |
| 5,359,464 A | * | 10/1994 | Wilkinson et al. ............. 360/32 |
| 5,530,501 A | * | 6/1996 | Bell ............................. 354/106 |
| 5,546,145 A | * | 8/1996 | Bernardi et al. ............. 354/105 |
| 5,644,557 A | | 7/1997 | Akamine et al. |
| 5,734,430 A | * | 3/1998 | Mishima et al. ............ 348/398 |
| 6,172,675 B1 | * | 1/2001 | Ahmad et al. ............... 345/328 |
| 6,211,921 B1 | * | 4/2001 | Charian et al. .............. 348/565 |
| 6,219,053 B1 | * | 4/2001 | Tachibana et al. ........... 345/348 |

FOREIGN PATENT DOCUMENTS

| | | |
|---|---|---|
| EP | 06670555 | 6/1995 |
| EP | 0928986 | 7/1999 |

OTHER PUBLICATIONS

Peter Noll, "Digital Audio Coding for Visual Communications", IEEE, Jun. 1995, pp. 925–943.*

Patricia Baggett, "The Role of Practice in Videodisc Based Procedural Instructions", IEEE, Jul. 1988, pp. 487–496.*

Elisabeth Horwitt, "Intranet Intricacies", PCWorld, Feb. 1, 1996.*

* cited by examiner

Primary Examiner—Raymond J. Bayerl
Assistant Examiner—Thomas J Joseph
(74) Attorney, Agent, or Firm—Fulbright & Jaworski, L.L.P.

(57) ABSTRACT

An apparatus for making recording media with audio code images by combining visual images converted from image information and audio code images encoded to be optically readable from audio information relating to the image information. This apparatus includes a monitor 60 for displaying composite images of visual images and audio code images. To transmit to a speaker audio signals corresponding to the audio code images displayed on the monitor 60, the apparatus has a first audio code image checking function including a pointing device 81 or keyboard 86, an audio data retriever 82, an audio reproducer 83, a speaker 84 and a controller 100, and a second audio code image checking function including the pointing device 81 or keyboard 86, audio reproducer 83, speaker 84, a reverse converter 85 and controller 100.

2 Claims, 4 Drawing Sheets

APPARATUS FOR MAKING RECORDING MEDIA WITH AUDIO CODE IMAGES

BACKGROUND OF THE INVENTION

1. Field of the Invention

This invention relates to apparatus for making recording media with audio code images by combining visual images converted from image information and audio code images encoded, to be optically readable, from audio information relating to the image information.

2. Description of the Related Art

Images taken with a photographing device such as a camera are printed on printing paper by the silver salt photographic method, or on paper or film by using an ink jet printer or the like. Thus, information on photographic objects can be transmitted in the form relying on the sense of sight across wide areas and in a timeless way. Recently, with the advent of the multimedia age, vigorous attempts have been made to use the sense of hearing in the transmission of information, instead of relying solely on the sense of sight. In Japanese Patent Laying-Open Publication H7-181606 (corresponding to U.S. Pat. No. 5,644,557), for example, new media have been proposed which provide not only visible but audible information. According to this technique, sound is converted into an optically readable dot code (audio code image) which is printed along with a still image. The printed dot code image is read with a special scanner to be outputted. These new media are suited to language teaching materials for use in repeating pronunciation practice, illustrated reference books for recording animal cries, and picture books which emit sound.

When creating the above new media, i.e. photographs with audio code images, a landscape photograph, for example, may include sounds around the landscape, or a snapshot may include an image of a person and the voice of that person recorded simultaneously with or after the photo taking. Original sound and image are put to an appropriate encoding process, an necessary, and are taken into an apparatus as audio data and image data, respectively. The audio data and image data are converted into an audio code image and a visual image which are combined and ultimately outputted as a recording medium with the audio code image. When creating numerous recording media with audio code images at the same time, the operator could inadvertently make wrong combinations of audio data (audio code images) and image data (visual images). This can happen since, while an image data displayed on a monitor can be clearly distinguished from other data, an encoded audio data cannot be distinguished though displayed on the monitor.

SUMMARY OF THE INVENTION

An object of this invention is to provide an apparatus for making photographs with audio code images, which facilitates checking of combinations of audio data (audio code image) and image data (visual image) displayed on a monitor in order to make recording media with audio code images.

The above object is fulfilled, according to this invention, by an apparatus for making recording media with audio code images by combining visual images converted from image information and audio code images encoded, to be optically readable, from audio information relating to the image information, the apparatus comprising a monitor for displaying composite images of the visual images and the audio code images, and an audio code image checking device for transmitting to a speaker a sound corresponding to each of the audio code images displayed on the monitor.

With this construction, in order to make recording media with audio code images, image data (visual images) and audio data (audio code images) are displayed on the monitor, and a sound corresponding to each audio data may be confirmed through the speaker. Thus, there occurs no error in combining the image data and audio data.

The terms frequently used herein will be defined as follows.

The term image data refers to image information in general inputted to the apparatus of this invention and converted into a format processable by this apparatus. The term audio data refers to audio information in general inputted to the apparatus of this invention and converted into the format processable by this apparatus. The term audio code image refers to the audio data encoded and put to a two-dimensional development to be optically readable. This code image takes a concrete form when printed out, but appears only in a dummy form on the monitor screen due to a limitation in resolution of the monitor. The term visual image refers to the image data put to a two-dimensional development to be visually recognizable when printed out or displayed on the monitor.

In one preferred embodiment of this invention, the audio code image checking device includes an audio data retriever for reading audio data corresponding to the audio code images from a storage. The audio data having yielded an audio code image is put to a necessary decoding process, and then released as an audible sound from the speaker. For this purpose, the original audio data must of course be stored in the storage as linked to the audio code image.

To cope with a situation where the original audio data is not stored or is inaccessible, the audio code image checking device in another preferred embodiment of this invention includes a reverse converter for reverse converting the audio code images displayed on the monitor (i.e. monitor display form of the audio data) to generate audio signals. Then, even in the absence of audio data having yielded an audio code image, an audible sound corresponding to the audio code image may be released from the speaker based on the reverse conversion of the audio code image.

In a further preferred embodiment of this invention, the audio code image checking device is operable to check a particular one of the audio code images, selected with a pointing device, on a screen of the monitor. In this case, the operator can not only check an audio code image a he or she desires, but check the desired audio code image while locking at a corresponding still image even when the monitor displays a plurality of audio code images or areas representing the audio code images.

In a different embodiment providing a similar advantage, the audio code image checking device is operable to check a particular one of the audio code images, selected by an input made through a keyboard, on a screen of the monitor. Specifically, signs or characters corresponding to the audio code images are displayed in or adjacent display regions of the audio code images on the monitor. By inputting one of these signs or characters through the keyboard, the operator may select an audio code image to be checked. Frames surrounding the display regions of the audio code images may be highlighted, or the display regions of the audio code images may be reversed. The display regions of the audio code images may be successively selected with arrow keys or the like, and a selection may be confirmed by pressing an enter key or the like, to determine an audio code images for checking.

In a further preferred embodiment of this invention, the apparatus comprises also an object generator for generating a single object corresponding to one of the recording media by selecting and combining image data and audio data to be recorded on the one of the recording media, the object generator having an object makeup information controller for maintaining object makeup information including a layout of a visual image corresponding to the image data in the object generated and an audio code image corresponding to an audio data in the object generated. With this construction, even where one recording medium includes numerous audio data and image data to be recorded thereon, not only an integrated control is performed therefor, but their layout is controlled also. Thus, the audio data and image data recorded may easily be altered afterward.

Other features and advantages of this invention will be apparent from the following description of the embodiments to be taken with reference to the drawings.

DESCRIPTION OF THE PREFERRED EMBODIMENTS

Figure 1:
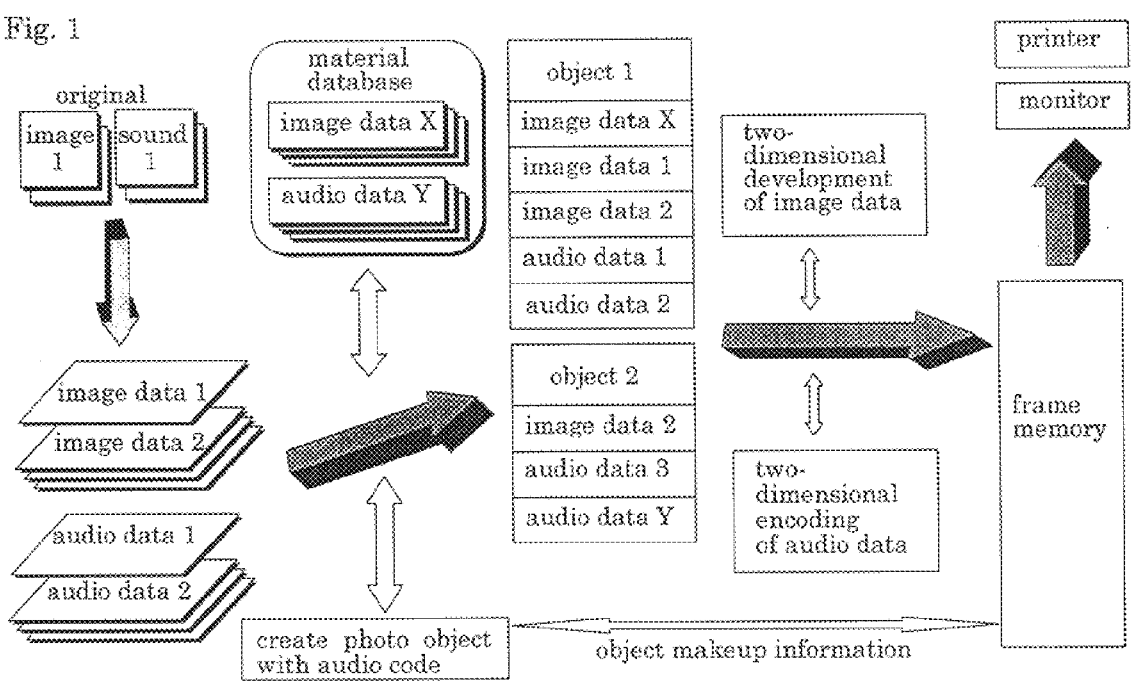
FIG. 1 is an explanatory view showing a flow of making photographs with audio code images in a photograph making apparatus according to this invention.

FIG. 1 shows a flow of operation of an apparatus for making recording media with audio code images according to this invention.

A customer who orders photographs with audio code images brings image recording media such as photographs or negative films and audio recording media such as cassette tapes serving as image information source and audio information source, or sound and image recording media such as a digital camera or digital video recording both sound and images, and indicate which images and sound should be combined. The sound and images in the recording media received are encoded as necessary, and temporarily stored in a storage medium such as a hard disk as image data and audio data in a format processable by the apparatus. This storage medium stores not only the image data and audio data received from the customer but data of various landscapes, illustrations, environmental sounds and so on. The customer may select these landscapes, illustrations and environmental sounds for incorporation into the recording media with audio code images.

In this embodiment, photographs are employed as the image information source. The recording media with audio code images will be called hereinafter photographs with audio code images. The photographs with audio code images are completely new photographic media having audio information recorded on photographs which are themselves old and well-known.

The operator combines the image data and audio data temporarily stored in the storage medium as required by the customer, and creates photographic objects with audio code images. Each photographic object with an audio code image or images corresponds to one photograph with an audio code image or images. One photographic object with an audio code images or images includes at least one image data and at least one audio data, but actually has only pointers indicating links of the data.

Figure 2:
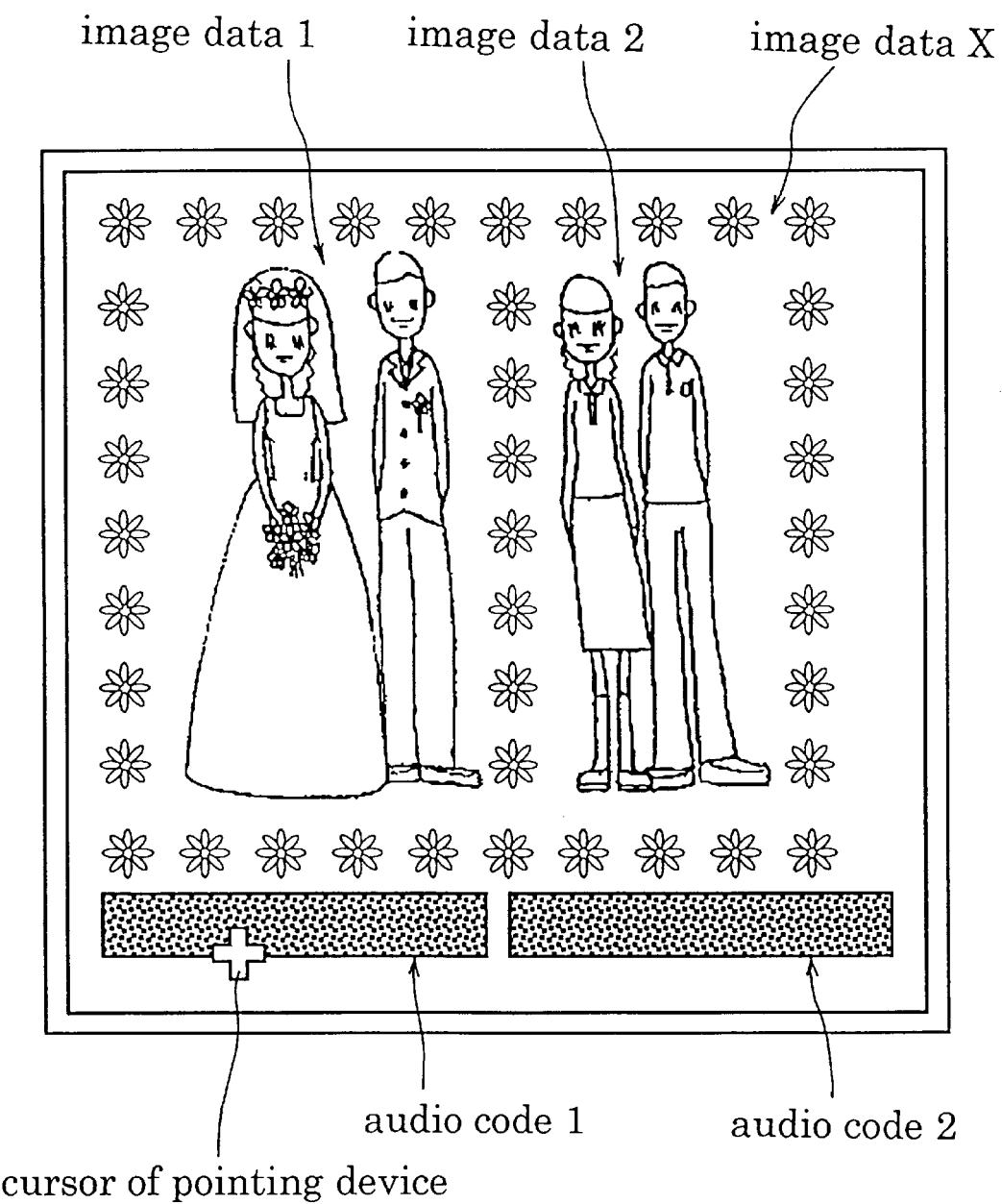
FIG. 2 is a schematic view of a monitor screen displaying a photograph with audio code images.

Once a photographic object with an audio code image or images is determined, the image data is put to a two-dimensional development and the audio data into a two-dimensional code based on its object makeup information. The two-dimensional data and code are combined and stored in a frame memory, which are to be ultimately printed as a photograph with an audio code image or images. The composite image stored in the frame memory is displayed on a monitor screen as shown in FIG. 2.

The operator may look at the monitor screen and check visual images and a layout of the visual images and audio code images for the predetermined photograph with audio code images. The contents of the audio code images are not visually recognizable and cannot be confirmed on the screen even through precisely displayed thereon. To confirm the audio code images, a mouse or the like is clicked on the audio code images displayed or frames representing the audio code images on the screen, or numerals or other signs displayed in or adjacent areas showing the audio code images are inputted through key switches. The sound corresponding to the audio code image selected may be produced from a speaker by the following two methods.

In one method of hearing the sound, a storage position of the audio data corresponding to the clicked or selected audio code image is located by using object makeup information. This audio data is put to an appropriate decoding process, and transmitted to the speaker to produce the sound. This method is based on the precondition that the audio data corresponding to the audio code image is stored in an accessible form. In the other method used where the above precondition is not satisfied, the two-dimensional code corresponding to the selected audio code image is taken out of the frame memory as separated from the composite image data. The two-dimensional audio code is put to a reverse conversion to restore the original audio data. The audio data restored is put to an appropriate decoding process, and transmitted to the speaker to produce the sound.

The composite image confirmed on the monitor screen is transmitted from the frame memory to a silver salt type printer or a thermal printer to output a photograph with the audio code images. The photograph with the audio code images finished in this way is passed on to the customer. The customer may hear the sound by scanning the audio code images with a known audio code image reading scanner.

Figure 3:
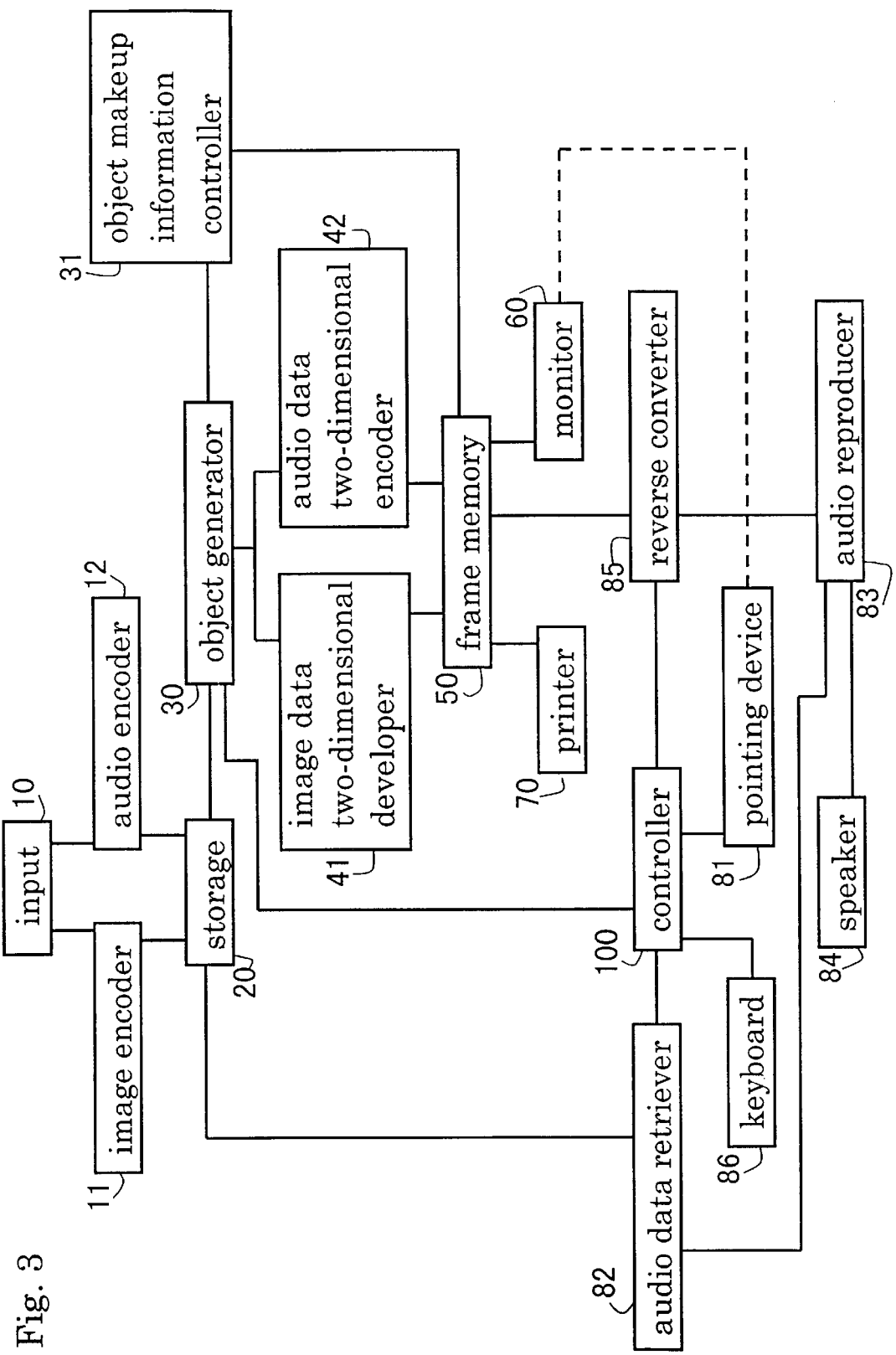
FIG. 3 is a functional block diagram showing the apparatus for making photographs with audio code images in one embodiment of this invention.

One example of apparatus for making photographs with audio code images in the above flow of operation will be described with reference to the functional block diagram shown in FIG. 3.

An input unit 10 is a generic term including a flat-bed scanner for acquiring information from still images such as photographs, posters and so on, a film scanner for acquiring information from still images such as of negative films, a special reader for reading information from a digital camera and digital video, and various audio players for using cassette tapes, CDs so on as input sources. An image encoder 11 is operable to convert inputted image information into a digital format for processing in this apparatus. An audio encoder 12 is operable to convert inputted audio information into the digital format for processing in this apparatus. A storage 20 stores image data and audio data converted by the encoders 11 and 12. The storage 20, while temporarily storing the data brought in by customers, also stores, until deleted forcibly, image data and audio data as a stock of materials available for selection by the customers as they wish.

An object generator 30 selectively reads image data and audio data from the storage 20 by using file names or the like, and generates a photographic object with an audio code image or images to make a photograph with the audio code image or images. As seen from FIG. 1, this object includes at least one image data and at least one audio data. The layout of the object determined is maintained in the form of object makeup information by an object makeup information controller 31.

This information must be developed in a frame memory 50 in order to display on a monitor 60 or output from a printer 70 a photograph with the audio code image or images based on the object determined. For this purpose, the image data of the object determined is developed by an image data two-dimensional developer 41, and transmitted to the frame memory 50. The audio data is developed by an audio data two-dimensional encoder 42, and transmitted to the frame memory 50. The image data and audio data are combined and arranged as desired in the frame memory 50, which may be confirmed directly on the monitor 60. Numeral 100 denotes a controller for controlling each functional component of the apparatus for making photographs with audio code images.

A construction for checking the contents of the audio data (audio code images) displayed on the monitor 60 will be described next.

As shown in FIG. 2, a pointing device 81 such as a mouse is used to click on the frame of an audio code image to be checked. The controller 100 identifies a corresponding audio data from the object makeup information, and reads the corresponding audio data from the storage 20 by means of an audio data retriever 82. The audio data read is put to a necessary decoding process at an audio reproducer 83 and transmitted to a speaker 84 as an amplified analog audio signal. As a result, an original sound is released from the speaker 84. By listening to the sound, the operator is able to check whether the audio code image displayed on the monitor 60 is correctly combined with a still image displayed simultaneously.

In the absence of the selected audio code image from the storage 20, the controller 100 reads only the audio code image corresponding to the selected audio code image frame from the frame memory 50 and transmits the image to a reverse converter 85. The reverse converter 85 carries out a process reverse to what is done at the audio data two-dimensional encoder 42, to convert the audio code image into audio data The audio data obtained from the reverse converter 85 is put to a necessary decoding process at the audio reproducer 83 and transmitted to the speaker 84 as an amplified analog audio signal. As a result, an original sound is released from the speaker 84.

Figure 4:
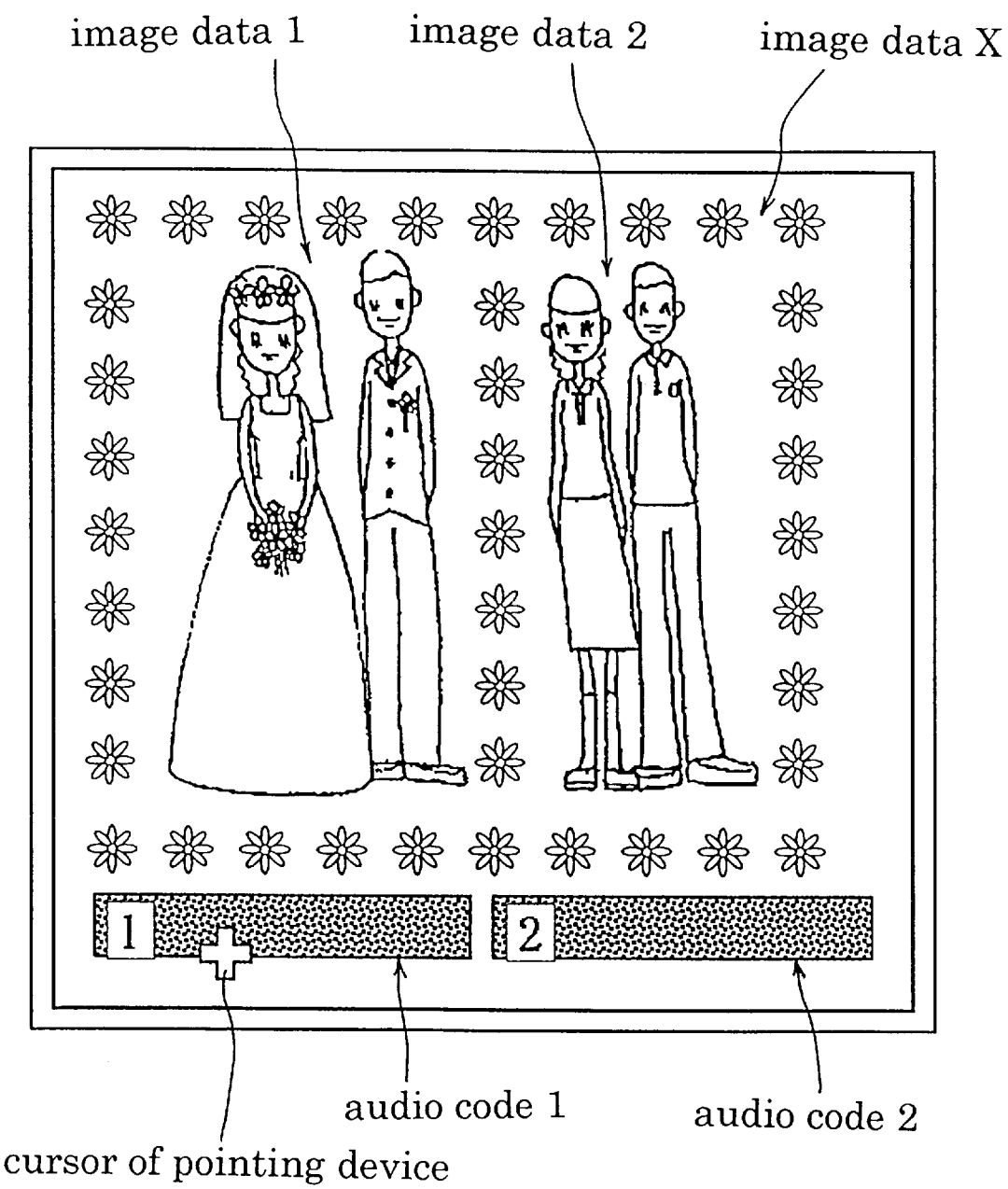
FIG. 4 is schematic view of a monitor screen displaying a photographic with audio code images in another embodiment.

In the above embodiment, the pointing device 81 is proposed as the means for selecting an audio code image to be checked on the monitor 60. Instead, as shown in FIG. 4, signs such as numerals or characters controlled by the object makeup information controller 31 may be superimposed on the audio code images per se or the frames representing the images displayed on the monitor 60. By inputting such a sign or character through a keyboard 86, an audio code image may be selected for checking. Such signs or characters may of course be displayed around the audio code images per se or the frames representing the images as long as the signs or characters are distinctive of the audio code images and frames. Further, though not shown in the drawings, frames surrounding display regions of the audio code images may be highlighted, or the display regions of the audio code images may be reversed, to facilitate recognition by the operator. The display regions of the audio code images may be successively selected with arrow keys or the like, and a selection may be confirmed by pressing an enter key or the like, to determine an audio code image for checking.

In the embodiments described hereinbefore, the audio code image checking device in the first aspect of this invention includes the pointing device 81 or keyboard 86, audio data retriever 82, audio reproducer 83, speaker 84 and controller 100. The audio code image checking device in the second aspect includes the pointing device 81 or keyboard 86, audio reproducer 83, speaker 84, reverse converter 85 and controller 100. The apparatus may allow a selection to be made between the above two audio checking modes, or employ only one of the two modes.

In the foregoing embodiments, the monitor 60 displays only one photographic object with audio code images. Of source, it is also possible to check a plurality of photographic objects with the audio code images displayed at the same time. The apparatus for making photographs with audio code images according to this invention is not limited to the above construction. The gist of this invention is to enable a reliable checking of a combination of a still image and an audio code image by outputting, as an audible sound, the audio code image which cannot be confirmed visually on the monitor 60. Various other apparatus constructions meeting this requirement should be understood as being included in the scope of this invention.

The audio code images may take the forms of not only the dot codes shown in Japanese Patent Laying-Open Publication H7-181606 discussed hereinbefore, but all known audio code images such as two-dimensional bar codes that may be read optically to reproduce sound.

What is claimed is:

1. Apparatus for making photographs with audio code images, said apparatus comprising:

a storage for storing image data and audio data inputted;

an object generator for generating an object for said photographs with audio code images by combining said image data and said audio data stored in said storage, wherein said object generator has an object makeup controller for maintaining object makeup information including a layout of a visual image area for said inputted image data and an audio code image area for said inputted audio data in said object;

a two-dimensional encoder for generating audio code imaging data encoded, to be optically readable, from audio data constituting said object, and transmitting these audio code imaging data to a frame memory in the form of a two-dimensional image, said two-dimensional encoder further transmitting said generated image data constituting said object to said frame memory in the form also of a two-dimensional image, said two-dimensional encoder combining said audio code imaging data and said image data based on said object makeup information into a single two-dimensional image as said object;

a printer for printing out said two-dimensional object developed into said frame memory as said photographs with audio code images;

a monitor for displaying said two-dimensional object so that said object can be checked before printing out said photographs with audio code images;

a pointing device for selecting an audio code image area of said object displayed on said monitor;

a reverse converter for reading, from said frame memory, said audio code imaging data corresponding to said audio code image area selected by said pointing device and reverse-converting said audio code imaging data into audio data; and an audio reproducer for outputting a sound with using said reverse-converted audio data.

2. Apparatus for making photographs with audio code images, said apparatus comprising:

a storage for storing image data and audio data inputted;

an object generator for generating an object for said photographs with audio code images by combining said image data and said audio data stored in said storage, wherein said object generator has an object makeup controller for maintaining object makeup information including a layout of a visual image area for said inputted image data and an audio code image area for said audio data in said object;

a two-dimensional encoder for generating audio code imaging data encoded, to be optically readable, from audio data constituting said object, and transmitting these audio code imaging data to a frame memory in the form of a two-dimensional image, said two-dimensional encoder further transmitting said generated image data constituting said object to said frame memory in the form also of a two-dimensional image, said two-dimensional encoder combining said audio code imaging data and said image data based on said object makeup information into a single two-dimensional image as said object;

a printer for printing out said two-dimensional object developed into said frame memory as said photographs with audio code images;

a monitor for displaying said two-dimensional object so that said object can be checked before printing out said photographs with audio code images;

a pointing device for selecting said audio code image area of said object displayed on said monitor;

an audio code retriever for retrieving, from said storage, said audio code data corresponding to said audio data image area selected by said pointing device; and an audio reproducer for outputting a sound with using said retrieved audio data.

* * * * *